W. M. Henderson,
Double-Acting Pump.
No. 818. Reissued Nov. 8, 1859.
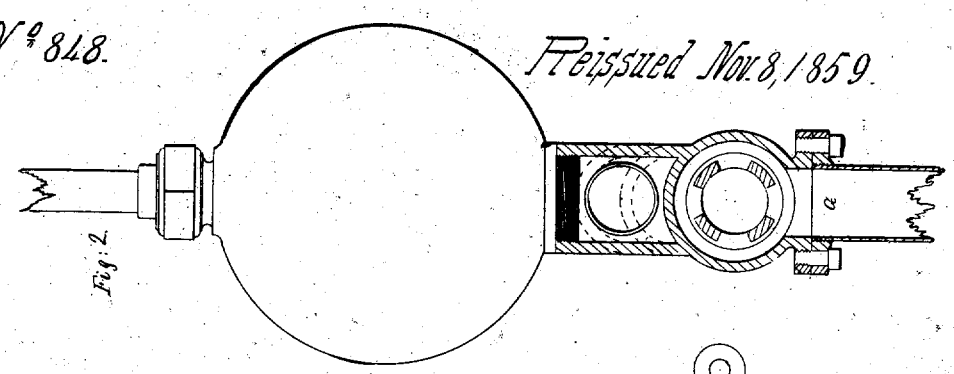
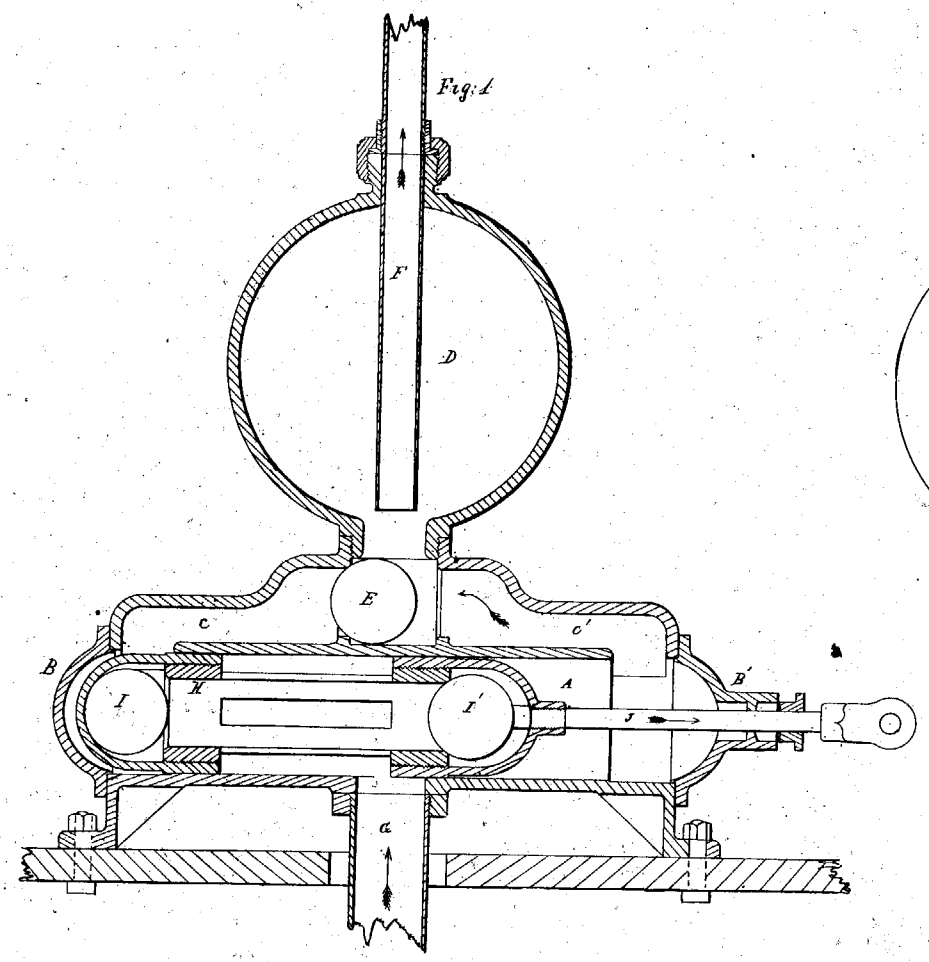
Witnesses:
Thos. J. Sapsley
William H. Stuart
Inventor:
William M. Henderson.
N. PETERS, PHOTO-LITHOGRAPHER, WASHINGTON, D. C.

UNITED STATES PATENT OFFICE.

WILLIAM M. HENDERSON, OF BALTIMORE, MARYLAND.

IMPROVEMENT IN PUMPS.

Specification forming part of Letters Patent No. 25,642, dated October 4, 1859; Reissue No. 848, dated November 8, 1859.

*To all whom it may concern:*

Be it known that I, WILLIAM M. HENDERSON, of Baltimore city and State of Maryland, have invented a new and useful Improvement in Double-Acting Force-Pumps; and I do hereby declare the following to be a full, clear, and exact description of the construction and operation of the same, reference being had to the annexed drawings, making a part of this specification, in which—

Figure 1 is a longitudinal section, and Fig. 2 a transverse section through the middle of the pump with the air-vessel in elevation.

The object of this improvement is to simplify the construction and operation of double-acting force-pumps by certain combination of valves, pistons, and water-ways, reducing to a minimum the water in the barrel after and in the direction of the stroke and causing it to flow in continuous direction from the suction and through the discharge pipe, as hereinafter more fully described.

A is the pump-barrel; B B′ the heads; C C′ the discharge-passages leading to D, the air vessel, and governed by E, a double-acting discharge-valve. F is the discharge, and G the suction, pipe. H is the plunger formed of two brass cages screwed onto the extremities of a central tube, which is slotted to allow of the free passage of the water to the suction-valves I I′, situated within said cages. J is the attached piston-rod for communicating motion.

The water enters by the suction-pipe into the space between the cages, and when the plunger is moved into the position shown on the drawings it forces open the suction-valve I′, filling the space at that end of the barrel. When the plunger moves in the direction indicated by the arrow, the valve I′ is forced back to its seat by the created pressure on the water, which is driven along the passage *c′*, forcing the discharge-valve E from the one seat to the other, opening a communication between that end of the barrel and the air-vessel, and by the same operation closing the other; or, if it be preferred, two discharge-valves may be employed. At the same time the water from the suction-pipe forces open the other suction-valve I by the created vacuum and fills the other end of the barrel, in readiness for the return stroke, which, being continued, will alternately discharge the water from the ends of the barrel in the direction of the stroke, causing it to flow in continuous direction from the suction and through the discharge pipe.

Having thus described my improvement in double acting force-pumps, what I claim as my invention, and desire to secure by Letters Patent, is—

The two-ball valve cages, with the suction-valves in their interior attached to the extremities of a central perforated tube or its equivalent, in combination with the water-ways and discharge valve or valves, the water entering between the plunger-valves and being alternately discharged from the ends of the pump-barrel in the direction of the stroke, the whole being constructed and operated substantially in the manner and for the purposes set forth.

WILLIAM M. HENDERSON.

Witnesses:

JAMES CATHERS,

C. C. HOLTZMAN.